Patented June 24, 1930

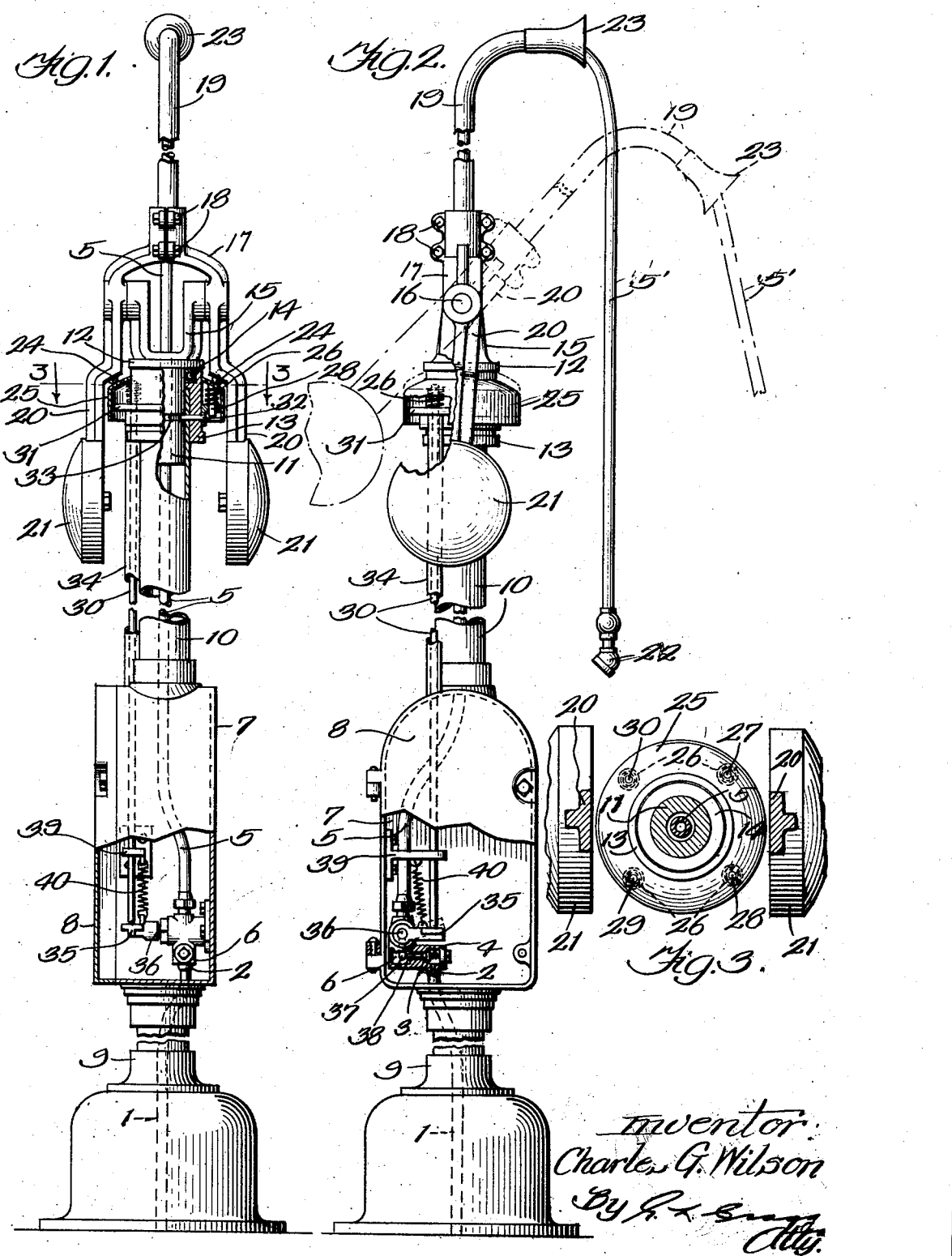

1,767,337

UNITED STATES PATENT OFFICE

CHARLES G. WILSON, OF BRYAN, OHIO, ASSIGNOR TO SERVICE STATION EQUIPMENT COMPANY, OF BRYAN, OHIO, A CORPORATION OF DELAWARE

APPARATUS FOR SUPPLYING AIR UNDER PRESSURE

Application filed July 27, 1928. Serial No. 295,791.

My invention relates to apparatus for supplying air under pressure through shiftable delivery piping to receivers such as pneumatic tires of vehicle wheels. Generally speaking, one characteristic of the invention resides in the provision of mechanism controlled by the piping and governing a valve in a manner to open the valve when the piping is taken for use and to close the valve when the piping is released.

The invention is of particular service in connection with apparatus of the class described which is inclusive of an arm that is mounted to swing in an upright plane and normally supports an air discharge hose or piping with its discharge end in an elevated position to be out of the way. The invention resides in providing a valve which prevents or permits the flow of air from a source of air under pressure to said discharge hose or piping and in such interrelation with the aforesaid arm as to be opened when the arm is drawn downwardly by the hose when taken for use and to be closed when the arm is restored to its normal hose lifting position. In the preferred embodiment of the invention, the arm is counterweighted to enable it automatically to assume an upright position when the discharge hose is released. The device preferably includes a spring buffer for dampening the return movement of the arm to avoid injury to the hose.

I will explain my invention more fully by reference to the accompanying drawing in which Fig. 1 is one elevation of the preferred embodiment of the invention, parts being broken away and shown in section; Fig. 2 is an elevation, parts being broken away and shown in section, taken at right angles to the direction in which Fig. 1 is taken; and Fig. 3 is a sectional view taken on line 3—3 of Fig. 1.

The source of air under pressure is inclusive of a pipe 1 that extends from an air pressure tank and which terminates, at its upper end, in a valve chamber 2. A valve 3 is normally pressed against its seat by a spring 4, the valve being thus normally closed. The piping 5 to which the air is supplied under pressure is connected at its lower end with the chamber 6 that is formed by a continuation of the valve casing 2 and which is normally shut off from the interior of this valve casing by the valve 3. A box 7 encloses the valve structure and parts that govern the same, this box having a door 8 by which it may be opened and closed. The box is mounted, preferably fixedly, upon a hollow pedestal 9 through which the pipe 1 passes downwardly into connection with the air pressure tank that may be in the ground. A hollow upright cylindrical pedestal 10 is mounted, at its lower end, preferably fixedly, upon the top of said box. A turn table structure is provided at the upper end of the hollow pedestal 10 and is inclusive of the hollow body portion 11 which is received and turns within the upper end of the pedestal 10, and a flange 12, constituting the table proper, which overlies the part 10.

A head 13 surrounds and is in fixed connection with the upper end of the pedestal 10 and supports an anti-friction bearing structure 14 upon which the table 11, 12 is supported and permitting this table freely to turn. A bearing structure, in the form of a yoke 15, is in fixed relation with the table 11, 12 so as to turn therewith. This bearing structure is inclusive of horizontally aligned stub shafts 16 provided at the upper end thereof and upon which the arm 17 is mounted to swing in an upright plane. This arm is fork shaped, the stem of the fork being hollow and split upon one side. Clamping bolts 18 serve to clamp the lower end of the curved pipe 19 which constitutes a continuation of the stem of the fork arm. The branches 20 of the fork arm are counterweighted, as indicated at 21, so as normally to place the arm in a substantially upright position. The piping 5 passes upwardly through the box 7, the pedestal 10, the turn table 11, 12, and through the hollow stem of the swinging arm. At least that portion 5' of the piping 5 which is surrounded by the stem portion 19 and passes out of this stem portion at the upper end thereof is in the form of a flexible hose which may terminate in a valve chuck 22 that is applicable to the nipple of a tire valve in a manner well understood. The invention, however, is not to be limited to the employment of a valve chuck at the discharge end of the piping 5. In order to prevent the external flexible discharge end portion of the piping 5 from becoming unduly worn, I flare the outlet end of the stem portion 19 as indicated at 23.

When the equipment is idle, the arm is substantially upright as indicated in Fig. 1 and in full lines in Fig. 2. When the piping 5 is taken for use, the chuck end 22 thereof is lowered to permit of its application to the tire nipple, the arm then being swung downwardly to a sufficient extent, as indicated, for example, by dot and dash lines in Fig. 2. The chuck 22 or, in other words, the discharge end of the piping 5, may be used upon any side of the structure, the turn table shifting to suit the location of such chuck. When the arm is upright, the valve 3 is closed by the spring 4 and when the arm is drawn downwardly by the piping 5, when taken for use, the valve is open, the preferred mechanism for controlling the valve being now described.

When the arm is upright, the balls 24 or other abutments upon the arm branches 20 press downwardly upon the vertically movable dome shaped plunger head 25 which skirts the head 13 that is fixed upon the pedestal 10 whereby this plunger head is maintained in its lowermost position against the force of coiled springs 26 which surround upright longitudinally movable rods 27, 28, 29 and 30 that have sliding fit within holes that are formed in the flanged collar 31 that surrounds and is in fixed connection with the head 13. Pins 32 are illustrated as being passed through the body of the flanged collar 31 and into the annular groove 33 in the body 11 of the turn table whereby said flanged collar is secured to the fixed head 13 and the vertical displacement of the turn table is prevented. The rods 27, 28 and 29 terminate in the region of the head 13 to constitute guiding pins. The aforesaid rods, being in fixed connection at their upper ends with the top of the dome shaped plunger head 25, prevent this dome from turning while guiding it in its vertical movements.

The rod 30 is elongated and extends downwardly through the tubular housing 34 into the box 7. The lower end of this latter rod bears upon one arm 35 of a bell crank or lever structure. This bell crank arm is fixed upon a shaft 36 which is suitably journaled upon the wall of the chamber 6. The other arm 37 of the bell crank is fixed at one end with the shaft 36 and has its other end in engagement with the outer end of the stem 38 of the valve 3. A bracket 39 is mounted upon and within the interior of the box 7, the rod 30 having snug sliding fit within a hole in the outer end of this bracket whereby the rod is guided when it moves vertically with the plunger head 25. A coiled spring 40 is connected at one end with the bracket 39 and at its other end with the bell crank arm 35 whereby this bell crank arm is constantly maintained in engagement with the lower end of the rod 30. When the swinging arm is in its upright position, the plunger head 25 is depressed, as explained, to depress the rod 30 which holds the bell crank arm 35 in its lowermost position against the force of the spring 40 to permit the spring 4 to firmly close the valve 3. When the piping 5 is taken for use, its discharge end 22 is grasped by the user and lowered to a usable position. The abutments 24 are consequently removed from engagement with the plunger 25, permitting this plunger to be raised to the position shown by dotted lines in Fig. 2 by the action of the springs 26. The rods 27, 28, 29 and 30 are lifted with said plunger head. The then raised rod 30 permits the spring 40 to lift the bell crank arm 35 whereby the valve stem 38 is pressed inwardly to open the valve and permit the air to flow from the air tank through the piping 5 to the tire or other air receiver.

The plunger 25 and the springs 26 pressing upwardly thereon constitute a spring buffer which checks or dampens the motion of the fork arm as this arm is being restored to its upright position by the counterweights thereon. The arm is prevented from unduly oscillating, the whipping of the hose 5' being thereby checked or eliminated to prevent undue wear thereon.

Changes may be made without departing from the invention.

Having thus described my invention, I claim:

1. The combination with a source of air under pressure, of discharge piping, a valve preventing and permitting the passage of air from said source through said piping, an arm mounted to swing in an upright plane and supporting a portion of said piping whose discharge end passes from one end of the arm, which arm end occupies an upright position to lift the discharge end of the piping when the piping is not in use, the arm being swung by the piping to lower this arm end when the discharge end of the piping is lowered for use, and mechanism operatively engaged by said arm enabling the closure of the valve when said arm end is restored to an upper position and causing the valve to be opened when this arm end is lowered upon lowering of the discharge end of the piping, the valve controlling mechanism that is engaged by the arm including a lever structure which is in controlling relation to the valve and a longitudinally movable upright rod in engaging relation to the lever structure and in turn operatively engaged by the arm.

2. The combination with a source of air under pressure; of discharge piping; a valve preventing and permitting the passage of air from said source through said piping; an arm mounted to swing in an upright plane and supporting a portion of said piping whose discharge end passes from one end or the arm; means for swinging the arm to bring said end of the arm to an upper position to lift the discharge end of the piping when the piping is not in use; and a spring buffer engaged by the arm when nearing its upright position then to check the movement of the arm, the buffer being moved by the arm when nearing its upright position and being in operative engagement with said valve.

3. The combination with a source of air under pressure; of discharge piping; a valve preventing and permitting the passage of air from said source through said piping; an arm mounted between its ends to swing in an upright plane and supporting a portion of said piping whose discharge end passes from one end of the arm, the arm being counterweighted at its other end to enable the first aforesaid arm end to occupay an upper position to lift the discharge end of the piping when the piping is not in use; and a spring buffer engaged by the arm when nearing its upright position then to check the movement of the arm, the buffer being moved by the arm, due to the counter weight thereon, when nearing its upright position and being in operative engagement with said valve.

In witness whereof, I hereunto subscribe my name.

CHARLES G. WILSON.